US012558887B2

(12) United States Patent
Nijkamp

(10) Patent No.: US 12,558,887 B2
(45) Date of Patent: Feb. 24, 2026

(54) CIRCUIT AND METHOD FOR DRIVING A PRINT HEAD

(71) Applicant: Canon Production Printing Holding B.V., Venlo (NL)

(72) Inventor: Aart Nijkamp, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 152 days.

(21) Appl. No.: 18/738,224

(22) Filed: Jun. 10, 2024

(65) Prior Publication Data

US 2024/0424783 A1 Dec. 26, 2024

(30) Foreign Application Priority Data

Jun. 21, 2023 (EP) .................................... 23180658

(51) Int. Cl.
*B41J 2/045* (2006.01)
*B41J 2/14* (2006.01)

(52) U.S. Cl.
CPC ....... *B41J 2/04573* (2013.01); *B41J 2/04541* (2013.01); *B41J 2/04548* (2013.01); *B41J 2/0455* (2013.01); *B41J 2/04575* (2013.01); *B41J 2/04581* (2013.01); *B41J 2/04588* (2013.01); *B41J 2/0459* (2013.01); *B41J 2/14008* (2013.01); *B41J 2/14233* (2013.01); *B41J 2002/14491* (2013.01)

(58) Field of Classification Search
CPC ......................... B41J 2/04573; B41J 2/04541; B41J 2/04548; B41J 2/0455; B41J 2/04575; B41J 2/04581; B41J 2/04588; B41J 2/0459; B41J 2/14008; B41J 2/14233; B41J 2002/14491
See application file for complete search history.

(56) References Cited

U.S. PATENT DOCUMENTS

| | | | | |
|---|---|---|---|---|
| 6,799,821 | B1 * | 10/2004 | Okuda | B41J 2/04581 347/68 |
| 10,843,459 | B2 * | 11/2020 | Bird | B41J 2/0451 |
| 2003/0146923 | A1 * | 8/2003 | Nakahira | G09G 3/3696 345/690 |

(Continued)

FOREIGN PATENT DOCUMENTS

| | | | | |
|---|---|---|---|---|
| EP | 3 702 160 A1 | | 9/2020 | |
| JP | 2008104221 A | * | 5/2008 | H03F 3/24 |

OTHER PUBLICATIONS

European Search Report, issued in Application No. 23 18 0658, dated Dec. 1, 2023.

*Primary Examiner* — Yaovi M Ameh
(74) *Attorney, Agent, or Firm* — Birch, Stewart, Kolasch & Birch, LLP

(57) ABSTRACT

An electronic circuit for driving an individual print element in a print head is disclosed. The print head comprises an array of print elements, each print element having a piezo-electric actuator that is capable of generating an acoustic wave in an ink chamber of the print element, resulting in the ejection of an ink drop out of a nozzle that is in fluid connection with the ink chamber. The electronic circuit comprises a number of analog drivers for amplifying an output current at a voltage level in-between two source voltage levels, wherein the drivers can be switched into a tristate condition at a voltage level that does not equal one of the source voltage levels.

6 Claims, 3 Drawing Sheets

(56) References Cited

U.S. PATENT DOCUMENTS

| | | | | |
|---|---|---|---|---|
| 2003/0230733 | A1* | 12/2003 | Tanaka | H04N 25/76<br>348/E5.09 |
| 2004/0169545 | A1 | 9/2004 | Aiba et al. | |
| 2018/0056648 | A1 | 3/2018 | Lahiri et al. | |

* cited by examiner

CIRCUIT AND METHOD FOR DRIVING A PRINT HEAD

BACKGROUND OF THE INVENTION

1. Field of the Invention

The present invention relates to an electronic circuit for driving the individual print elements in a print head comprising an array of print elements, each print element having a piezo-electric actuator that is capable of generating an acoustic wave in an ink chamber of the print element, resulting in the ejection of an ink drop out of a nozzle that is in fluid connection with the ink chamber. Furthermore, the present invention relates to a method for using this circuit in an ink jet printer.

2. Description of the Related Art

Ink jet printers get more and more sophisticated as the experience with the flow of liquids in small ink chambers grows. This shows in the use of different kind of inks that are jetted with ever smaller print elements. One of the enablers for this development is the employment of specialized electronic circuits for driving the actuators in the print heads. The present invention is directed to such a circuit for driving a piezo-electric actuator, that transforms electric energy into mechanical energy in the form of an acoustic wave in the ink chamber that is connected to the actuator. The term "print head", "print" and derivatives thereof are to be understood to include any device or technique that deposits or creates material on a surface in a controlled manner.

Many drive circuits are designed to switch a common drive waveform, that is generated outside of the print head, to one or more of the actuators in the print head. The functionality of the circuit, which is usually embodied as an ASIC, is then limited to a multiplexer functionality and the dissipation that goes hand in hand with the generation of a drive current is kept outside of the print head. This facilitates the thermal control of the print head, keeping it at or around a suitable operating temperature. In order to adapt the common drive waveform to an individual actuator, which behaves electrically as a capacitance, additional drive current may be added at appropriate timing within the waveform. This is supplied from an additional voltage source that is temporarily, in the order of microseconds, switched to the actuator of the print element. Thus, a limited number of power sources is used to compose various drive waveforms with varying effectivity. An example of this kind of circuit, sometimes indicated as "cold switch circuits" or switch circuit, is given in patent application US2018/056648.

Another kind of circuit, sometimes indicated as "hot switch circuit", also known as driver circuit, comprises a number of power sources with fixed voltage levels that are used to drive the necessary current to and from an actuator, according to an individualized drive waveform, which is characterized by a number of parameters, indicating the timing and charging current of the waveform. These currents are controlled by a number of switches that allow exactly one of the power sources to have electrical access to the actuator, which is then charged up or down to the voltage level of the power source with a predetermined electric current.

A waveform for controlling the ink behaviour in a print element with a piezo-electric actuator may comprise several electrical pulses, i.e. voltage transitions from one voltage level to another. The mechanical response of the actuator to these voltage transitions causes the ink chamber to expand or compress, which results in the movement of ink in the chamber, leading to a movement of an ink meniscus in a nozzle, that is in fluid connection with the ink chamber. Depending on the amount of movement, an ejection of ink out of the nozzle, which is also known as drop ejection port, may result. However, the movement of ink in the nozzle may also be induced in order to prevent clogging of ink in the nozzle, without resulting in the ejection of an ink drop. Other effects may also be pursued.

Thus, the required waveforms become more complex and there is a need for more extended circuits. In particular, complex waveforms may need more power sources and more switches to select one of these sources to provide the required current. The circuits are implemented as ASIC (application specific integrated circuits) which are designed upon specification and which become more expensive by these increasing requirements.

It is an object of the invention to provide a circuit and a method for driving a print head with an arbitrary waveform without increasing the number of power sources, thereby limiting the cost of the ASIC.

SUMMARY OF THE INVENTION

In order to achieve this object, the electronic circuit according to the invention comprises a number of analog drivers for amplifying an output current at a voltage level in-between two source voltage levels, wherein the drivers can be switched into a tristate condition at a voltage level that does not equal one of the source voltage levels. The tristate condition is obtained when the current from the driver to the piezo-electric actuator is blocked and the capacitive load, the piezo-electric actuator, is left in current-less state. Depending on the amount of leakage current, the voltage will only be stable for a limited amount of time, but this is usually much longer than the time before a new charging pulse is applied. In this way, complex waveforms may be designed without applying many voltage sources.

Further details of the invention are given in the dependent claims. In an embodiment, the circuit is configured with accurate, submicrosecond timing for controlling the time that the current is switched on. This provides an accurate control of the voltage level that is obtainable. A total waveform takes a time in the order of 10 to 30 microseconds, whereas a pulse, which is a single transition from one voltage to another, takes a time in the order of one microsecond. The timing of the circuit is therefore preferably more accurate than this.

In a further embodiment, the circuit comprises three analog drivers and four source voltage levels. One of these source voltage levels may be the ground level. This amount of voltage levels provides an optimal balance between complexity and costs on the one side and versatility and functionality on the other.

In a embodiment, the circuit is embodied in an application specific integrated circuit (ASIC), wherein multiple circuits are assembled and each circuit is assigned to one of the print elements of a print head. In this way all print elements can be individually controlled.

The invention also comprises a method for driving a piezo-electric actuator with a preprogrammed waveform of voltage levels using the electronic circuit, the waveform comprising a steady voltage level that is not available as a source voltage level, the method comprising a step of switching to a tristate condition at an appropriate timing, thereby maintaining the voltage level at the moment of switching to the tristate. Instead of using a separate source voltage level, the capacitive load of the circuit is used to hold the present voltage on a fixed level for an amount of time that is in the order of about ten microseconds, depending on the amount of current leakage. This is regarded as a constant voltage within the time frame of the applied waveforms.

The circuit is especially usefully applied in a printer comprising a print head with an array of print elements, each print element having a piezo-electric actuator that is capable of generating an acoustic wave in an ink chamber of the print element, resulting in the ejection of an ink drop out of a nozzle that is in fluid connection with the ink chamber for driving the individual print elements.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF EMBODIMENTS

Figure 1:
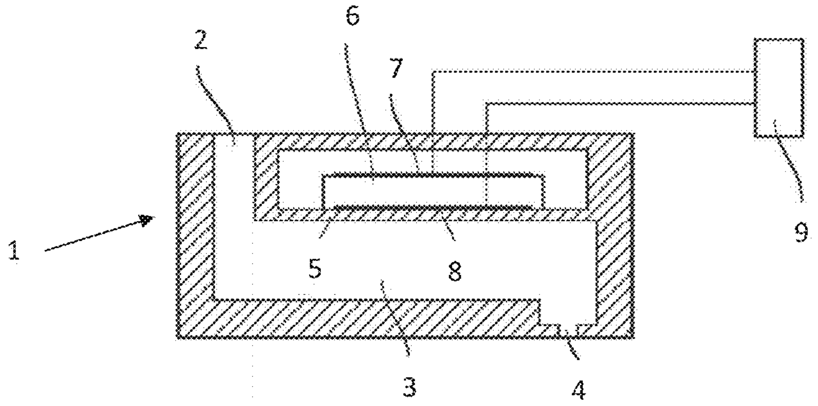
FIG. 1 is a schematic cross-sectional view of a single inkjet print element that is driven by the electronic circuit.

The present invention will now be described with reference to the accompanying drawings, wherein the same or similar elements are identified with the same reference numeral.

FIG. 1 is a schematic view of an individual inkjet print element 1. It has an ink supply passage 2, ending in a pressure chamber 3 that narrows down to a nozzle 4. Ink is provided to the inkjet print element out of an ink reservoir. One wall of the pressure chamber 3 is constituted by a flexible membrane 5 to which a piezoelectric actuator 6 has been attached. When an electric voltage is applied to electrodes 7, 8 on either side of the actuator 6, the actuator causes the membrane 5 to flex into the pressure chamber 3, thereby creating an acoustic pressure wave in the ink in the pressure chamber. The pressure wave propagates to the nozzle 4, with the result that an ink droplet is expelled from the nozzle. The electrodes 7, 8 are connected to an electric source 9, where an electric signal is generated that is able to drive the inkjet print element. It is known that the position and movement of the meniscus of the ink inside the nozzle is an important element for the properties of the ink drops, such as their size and velocity, generated by the print element. Therefore, various waveforms are applied for controlling the ink behavior in the pressure chamber 3.

Figure 2:
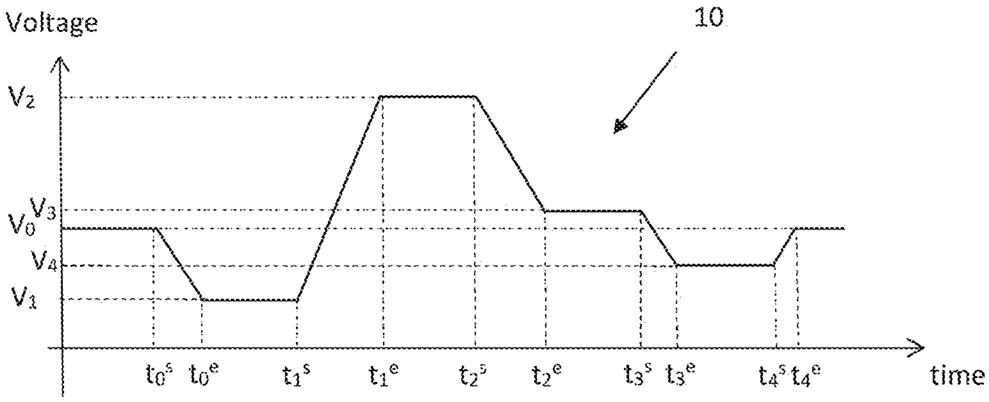
FIG. 2 shows a waveform for jetting ink drops out of the print element.

FIG. 2 shows a waveform 10, which is formed by a series of voltage levels and voltage transitions, in this case five, that are applied across the electrodes 7 and 8 of the piezo-electric actuator of the inkjet print element. A higher voltage in this waveform causes a smaller volume of the pressure chamber 3. Starting from the initial voltage $V_0$, a first pulse starts at a time $t_0^s$ and ends at time $t_0^e$. These timings are related to the propagation of an acoustic wave in the ink and the geometry of the pressure chamber 3. An output current that charges the capacitive load is calibrated in such a way that the voltage across the piezo-electric actuator changes from $V_0$ to $V_1$. The further parameters for the waveform are readily understood. In conventional electronic circuits all the voltage levels are provided by external power sources, one for each voltage level. In the circuit according to the invention, some of the voltage levels are not generated by an external power source, but are obtained by stopping the current to the actuator at a suitable timing and leaving the actuator currentless.

Figure 3:
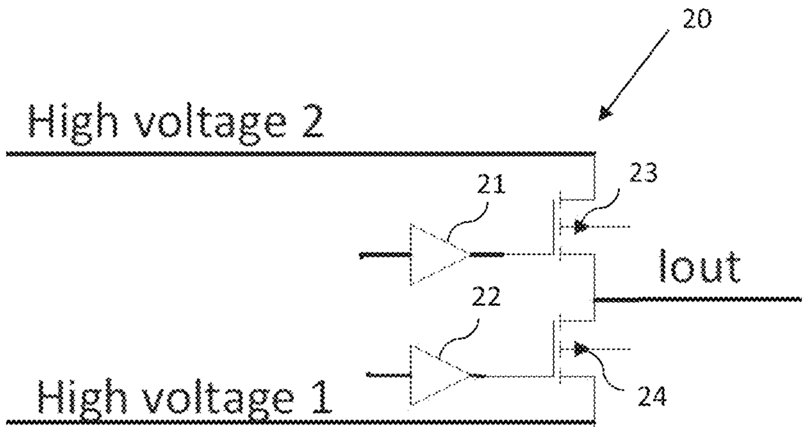
FIG. 3 is an analog driver circuit for controlling an output current.

An electronic circuit for generating an appropriate output current is given in FIG. 3. Circuit 20 comprises two analog amplifiers 21, 22 that control the gate voltage of the output FET 23, 24. This configuration forms a standard way to generate high output currents at a voltage level between high voltage 1 and high voltage 2, in particular for integration in an integrated circuit.

Figure 4:
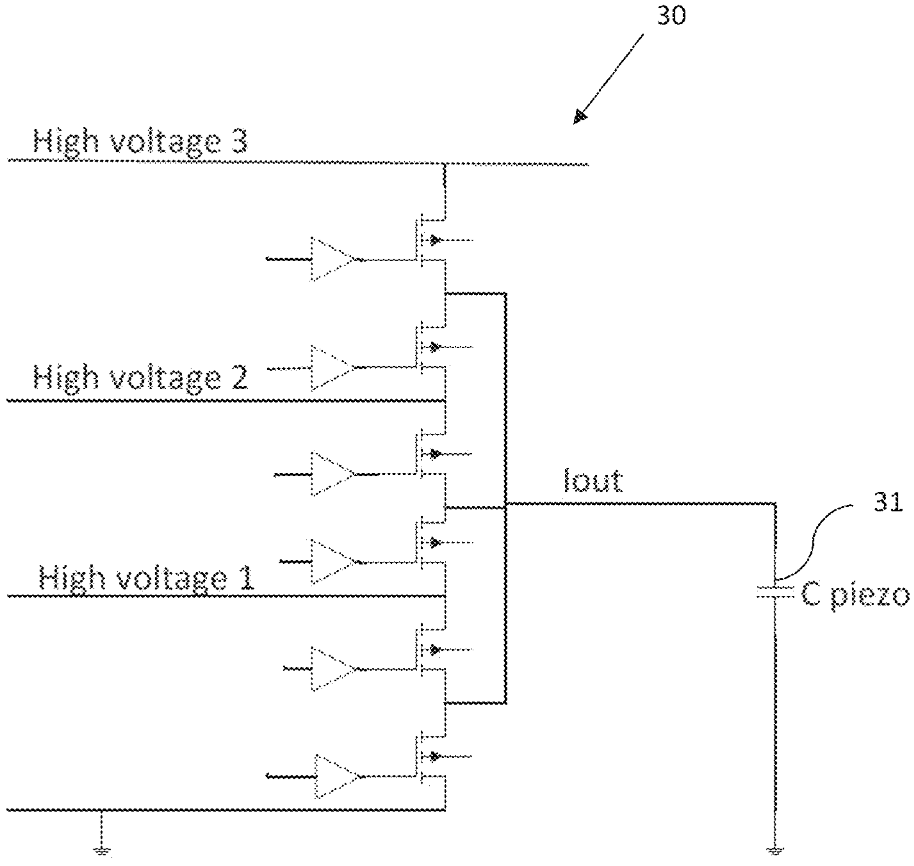
FIG. 4 is an electronic circuit according to the invention.

Three of the circuits 20 are combined to the circuit 30 in FIG. 4, wherein one of the voltage levels is the ground level, to which also one of the electrodes of the piezo-electric capacitance 31 is connected. This driver circuit enables the generation of waveforms, such as indicated in FIG. 2. In order to be able to obtain a different voltage level than the High voltage 1, 2, 3 and ground, the driver can be switched into tristate, which leaves the capacitance 31 floating. The timing for this switching is in the range of submicroseconds in order to have an appropriate resolution of the voltage levels that can be obtained. By including the specification of a tristate, the circuit is more generally applicable, especially for situations wherein the state of a print element is probed.

Figure 5:
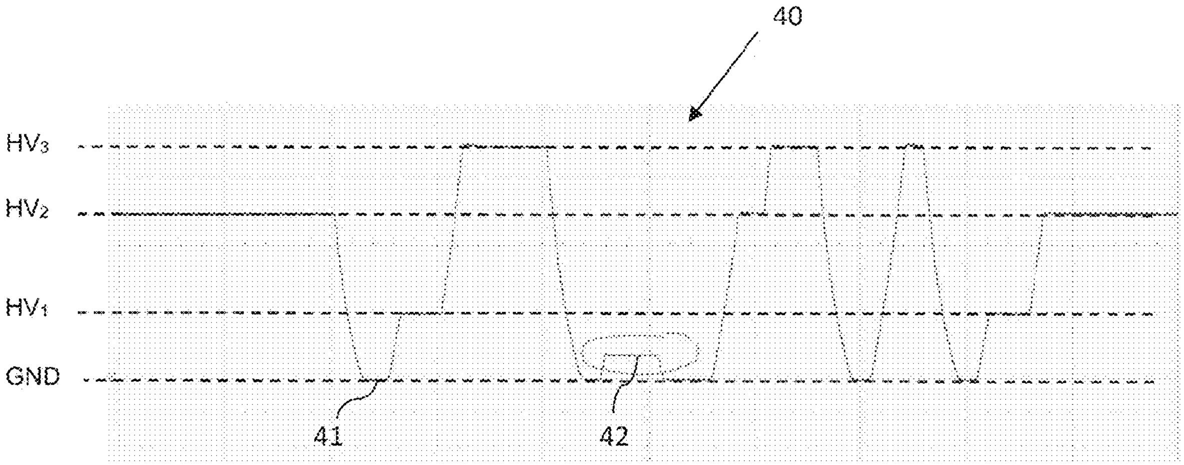
FIG. 5 is an example of a measured waveform that comprises a voltage level that is not a source voltage.

FIG. 5 shows a measured waveform 40 from a circuit as in FIG. 4. The various voltage sources have a value GND (ground), $HV_1$, $HV_2$ and $HV_3$. The first transition is from $HV_2$ to GND, being the first level 41 of the waveform. However, by switching the circuit into tristate, a stable level 42 is obtained, not equal to one of the source voltage values. Thus, a variety of waveforms may be designed without making the ASIC that drives the print elements, more complex.

The skilled person will recognise that other embodiments are possible within the scope of the appended claims.

The invention claimed is:

1. An electronic circuit for driving an individual print element in a print head comprising an array of print elements, each print element having a piezo-electric actuator that is capable of generating an acoustic wave in an ink chamber of the print element, resulting in the ejection of an ink drop out of a nozzle that is in fluid connection with the ink chamber, the electronic circuit comprising at least two power sources with fixed source voltage levels and a number of analog drivers for amplifying an output current at a voltage level in-between two of the at least two source voltage levels, wherein the drivers can be switched into a tristate condition at a voltage level that does not equal one of the source voltage levels, thereby keeping the piezo-electric actuator at said voltage level.

2. The electronic circuit according to claim 1, that is configured with accurate, submicrosecond timing for controlling the time that the current is switched on.

3. The electronic circuit according to claim 1, that comprises three analog drivers and four fixed source voltage levels.

4. The electronic circuit according to claim 1, that is embodied in an ASIC.

5. A method for driving a piezo-electric actuator with a preprogrammed waveform of voltage levels using an electronic circuit according to claim 1, the waveform comprising a steady voltage level that is not available as a source voltage level, the method comprising a step of switching to a tristate condition at an appropriate timing, thereby maintaining the voltage level at the moment of switching to the tristate.

6. A printer comprising a print head with an array of print elements, each print element having a piezo-electric actuator that is capable of generating an acoustic wave in an ink chamber of the print element, resulting in the ejection of an ink drop out of a nozzle that is in fluid connection with the ink chamber and furthermore comprising an electronic circuit for driving the individual print elements according to claim 1.

* * * * *